W. P. WALKER.
RATCHET WRENCH.
APPLICATION FILED JAN. 13, 1908.

898,806.

Patented Sept. 15, 1908.

Witnesses.
Lloyd Blackmore
P. Sher

Inventor.
W. P. Walker

UNITED STATES PATENT OFFICE.

WILLIAM PATRICK WALKER, OF EDMONTON, ALBERTA, CANADA.

RATCHET-WRENCH.

No. 898,806.   Specification of Letters Patent.   Patented Sept. 15, 1908.

Application filed January 13, 1908. Serial No. 410,684.

*To all whom it may concern:*

Be it known that I, WILLIAM PATRICK WALKER, a subject of the King of Great Britain, residing at 617 Namayo avenue, in the city of Edmonton, in the Province of Alberta, in the Dominion of Canada, have invented certain new and useful Improvements in Ratchet-Wrenches, of which the following is a specification.

The invention relates to improvements in ratchet wrenches, as described in the present specification and illustrated in the accompanying drawings that form part of the same.

The invention consists essentially in the novel arrangement and construction of parts, whereby a plain bearing surface is formed on the rotatable nut grip turning in a correspondingly formed hole at the end of the lever, and a spring-held pawl engages said nut grip, said grip being retained in said hole by a suitable keeper removable therefrom.

The objects of the invention are to devise an efficient and simple form of the ratchet type of wrench, and to arrange the parts in such manner that they may be removed with ease and readily replaced.

Figures 1, 2:
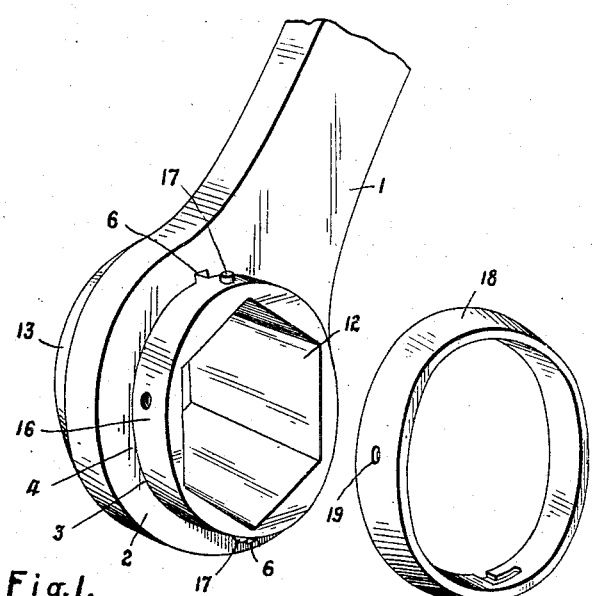
Figure 3:
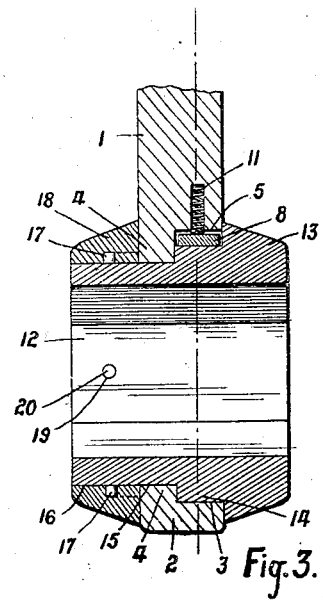
Figure 4:
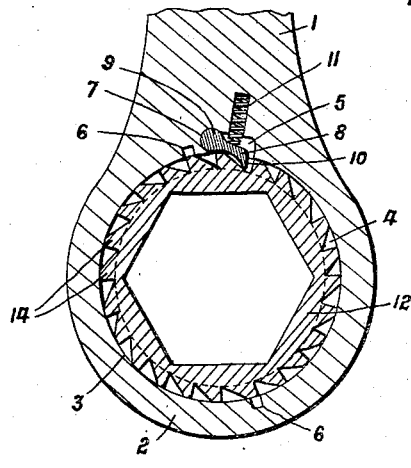

In the drawings, Figure 1 is a perspective view of the device having the keeper ring removed. Fig. 2 is a perspective detail of the keeper ring. Fig. 3 is a sectional plan view of the arrangement of nut grip, lever and pawl and ratchet. Fig. 4 is a cross sectional view of the parts assembled.

Like numerals of reference indicate corresponding parts in each figure.

Referring to the drawings, 1 is the lever having the enlarged end 2 and the hole 3 through said enlarged end, the lower portion of the inner wall of said hole 3 being inwardly flanged and forming the ledge 4 intermediate of the height of said inner wall. 5 is a recess in the said inner wall above the ledge 4. 6 are grooves or passages in and across the flange portion of the said inner wall. The recess 5 at its inner end is formed into the socket 7, in which a pawl 8 is inserted having the corresponding inner end 9 and the tooth portion 10 at its outer end. 11 is a spiral spring introduced into a corresponding hole in the wall of the recess 5 and exerting a continuous pressure on the back of the pawl 8.

12 is the nut grip piece formed at one end into a retaining ring portion 13, said ring engaging the surface of the lever around the hole 3 at the larger side of said hole.

14 are ratchet teeth formed in a ring and immediately beside the ring portion 13.

15 is a bearing surface adjoining the ratchet teeth 14 and engaging the inner wall of the hole 3 at the smaller side thereof, the remainder 16 of the plain surface extending beyond said hole.

17 are pins projecting from the surface 16 diametrically opposite one to the other and passing through the grooves 6 in introducing said nut grip into the hole 3.

18 is the keeper ring preferably of similar formation to the retaining ring portion 13 of the nut grip 12 and having L-shaped slots in its inner wall diametrically arranged one to the other and engaging the pins 17 through the arrangement of said slots. 19 is a hole through the said ring 18, and 20 is a screw inserted in said hole 19 and entering a suitable correspondingly threaded hole in the surface 16 of the nut grip 12.

In the operation of this invention, the nut grip is placed on the nut to be turned and the lever manually swung backwardly, which permits the pawl 8 to travel from tooth to tooth of the teeth 14, the lever is then pulled forwardly and engages the face of a tooth and turns the said nut grip around and consequently the nut. This operation is repeated until the nut is fully tightened and home.

In the present description, for convenience, the upper side of the wrench has been called that on which the keeper ring is placed as it naturally would be, but it must be fully understood that in naming the various parts in their arrangement, the said keeper ring side of the device, when the parts are assembled, may be just as often the underside as the upperside and it is only with a view of more clearly describing the invention that the distinctions between the upper and lower sides have been made in the explanation of details concerned in the invention.

What I claim as my invention is:

In a device of the class described, in combination, a lever having an enlarged end and a hole through said end, said hole having an inwardly extending flange intermediate of its depth forming a ledge, a nut grip piece having a retaining ring outer portion abutting the inner surface of said enlarged end around said hole, a ring of teeth adjacent to said retaining ring, a plain surface adjacent to said ring of teeth and a projecting plain surface beyond said hole, pins projecting outwardly from said outer plain surface of the nut grip piece, a spring-held pawl engaging said teeth, and a keeper ring having L shaped slots from its inner edge diametrically arranged and sliding over said pins, said keeper ring being suitably secured to and turning with said nut grip piece.

Signed at the city and district of Montreal, in the Province of Quebec, in the Dominion of Canada, this fourth day of January, 1908.

WILLIAM PATRICK WALKER.

Witnesses:
G. H. TRESIDDER,
L. BLACKMORE.